United States Patent
Shmulevich et al.

(10) Patent No.: US 8,555,159 B1
(45) Date of Patent: Oct. 8, 2013

(54) DYNAMIC DISPLAY OF WEB PAGE CONTENT FOR EDITING AND REVIEW

(75) Inventors: Igor Shmulevich, San Ramon, CA (US); Gary Tang, Santa Clara, CA (US); Ling Chen, San Jose, CA (US); Andy Simmons, Montara, CA (US)

(73) Assignee: EMC Corporation, Hopkinton, MA (US)

( * ) Notice: Subject to any disclaimer, the term of this patent is extended or adjusted under 35 U.S.C. 154(b) by 1470 days.

(21) Appl. No.: 11/638,081

(22) Filed: Dec. 13, 2006

(51) Int. Cl.
*G06F 17/00* (2006.01)

(52) U.S. Cl.
USPC .......................................................... 715/255

(58) Field of Classification Search
USPC .................... 715/202, 208, 277, 760, 255
See application file for complete search history.

(56) References Cited

U.S. PATENT DOCUMENTS

| | | | |
|---|---|---|---|
| 5,937,160 A | 8/1999 | Davis et al. | |
| 6,092,074 A * | 7/2000 | Rodkin et al. | 1/1 |
| 6,247,032 B1 * | 6/2001 | Bernardo et al. | 715/234 |
| 6,343,302 B1 * | 1/2002 | Graham | 715/205 |
| 6,557,013 B1 * | 4/2003 | Ziff et al. | 1/1 |
| 6,560,639 B1 * | 5/2003 | Dan et al. | 709/218 |
| 6,611,835 B1 | 8/2003 | Huang et al. | |
| 6,750,885 B1 | 6/2004 | Finch et al. | |
| 6,842,782 B1 * | 1/2005 | Malik et al. | 709/224 |
| 6,961,905 B1 * | 11/2005 | Cover et al. | 715/760 |
| 7,062,506 B2 * | 6/2006 | Taylor et al. | 1/1 |
| 7,143,344 B2 | 11/2006 | Parker et al. | |
| 7,194,469 B1 * | 3/2007 | Dowd et al. | 707/10 |
| 7,194,680 B1 * | 3/2007 | Roy et al. | 715/205 |
| 7,237,002 B1 * | 6/2007 | Estrada et al. | 709/203 |
| 7,316,003 B1 * | 1/2008 | Dulepet et al. | 717/111 |
| 7,383,320 B1 * | 6/2008 | Silberstein et al. | 709/219 |
| 7,401,083 B2 | 7/2008 | Daemke et al. | |
| 7,668,913 B1 * | 2/2010 | Underwood et al. | 709/205 |
| 7,827,075 B2 * | 11/2010 | Hess et al. | 715/748 |
| 8,156,141 B1 * | 4/2012 | Shmulevich et al. | 707/770 |
| 2002/0046244 A1 * | 4/2002 | Bimson et al. | 709/205 |
| 2002/0046245 A1 * | 4/2002 | Hillar et al. | 709/205 |
| 2002/0091725 A1 * | 7/2002 | Skok | 707/501.1 |
| 2002/0140730 A1 * | 10/2002 | Linsey et al. | 345/751 |
| 2002/0184255 A1 * | 12/2002 | Edd et al. | 707/500 |
| 2003/0023632 A1 * | 1/2003 | Ries et al. | 707/513 |
| 2003/0028801 A1 | 2/2003 | Liberman et al. | |
| 2003/0033378 A1 * | 2/2003 | Needham et al. | 709/218 |
| 2003/0074634 A1 * | 4/2003 | Emmelmann | 715/513 |
| 2003/0101255 A1 | 5/2003 | Green | |
| 2003/0163519 A1 * | 8/2003 | Kegel et al. | 709/203 |
| 2003/0177200 A1 * | 9/2003 | Laughlin et al. | 709/218 |
| 2003/0196171 A1 * | 10/2003 | Distefano, III | 715/513 |

(Continued)

OTHER PUBLICATIONS

Ruvalcaba, Macromedia Dreamweaver 8 Unleashed, Sams Publishing, Oct. 7, 2005, p. 504-518.*

(Continued)

*Primary Examiner* — Laurie Ries
*Assistant Examiner* — Frank D Mills
(74) *Attorney, Agent, or Firm* — Van Pelt, Yi & James LLP

(57) ABSTRACT

Facilitating definition of a web page is disclosed. An indication that an external data is to be incorporated into the web page from an external source, such as another web page, is received via an editing interface. The external data is retrieved in real time from the external source and displayed in the editing interface.

19 Claims, 7 Drawing Sheets

(56) References Cited

U.S. PATENT DOCUMENTS

| | | | | |
|---|---|---|---|---|
| 2003/0204811 A1* | 10/2003 | Dam et al. | .................... | 715/500 |
| 2004/0006747 A1* | 1/2004 | Tyler | ............................ | 715/530 |
| 2004/0019634 A1* | 1/2004 | Van Geldern et al. | ........ | 709/203 |
| 2004/0125130 A1* | 7/2004 | Flamini et al. | ................ | 345/738 |
| 2004/0148318 A1* | 7/2004 | Taylor et al. | .................. | 707/203 |
| 2004/0148565 A1* | 7/2004 | Davis et al. | ............... | 715/501.1 |
| 2004/0148576 A1* | 7/2004 | Matveyenko et al. | ........ | 715/530 |
| 2004/0205529 A1* | 10/2004 | Poulose et al. | ................ | 715/506 |
| 2004/0205659 A1* | 10/2004 | Barry et al. | .................. | 715/530 |
| 2004/0215719 A1* | 10/2004 | Altshuler | ...................... | 709/204 |
| 2004/0217985 A9* | 11/2004 | Ries et al. | ..................... | 345/740 |
| 2004/0225658 A1 | 11/2004 | Horber | | |
| 2005/0050462 A1 | 3/2005 | Whittle et al. | | |
| 2005/0108418 A1* | 5/2005 | Bedi et al. | .................... | 709/232 |
| 2005/0171947 A1 | 8/2005 | Gautestad | | |
| 2005/0229101 A1* | 10/2005 | Matveyenko et al. | ........ | 715/530 |
| 2005/0246627 A1* | 11/2005 | Sayed | .......................... | 715/513 |
| 2005/0262427 A1* | 11/2005 | Cantwell et al. | ........... | 715/501.1 |
| 2006/0031404 A1* | 2/2006 | Kassab | ......................... | 709/218 |
| 2006/0129635 A1* | 6/2006 | Baccou et al. | ................ | 709/203 |
| 2006/0235984 A1* | 10/2006 | Kraus et al. | .................. | 709/228 |
| 2006/0248442 A1* | 11/2006 | Rosenstein et al. | ........ | 715/501.1 |
| 2007/0162845 A1 | 7/2007 | Cave et al. | | |
| 2007/0186170 A1* | 8/2007 | Carter, II | ...................... | 715/744 |
| 2007/0208773 A1 | 9/2007 | Tsao | | |
| 2007/0209005 A1 | 9/2007 | Shaver et al. | | |
| 2007/0239726 A1* | 10/2007 | Weiss et al. | ..................... | 707/10 |
| 2008/0005125 A1* | 1/2008 | Gaedeke | ........................ | 707/10 |
| 2008/0005282 A1* | 1/2008 | Gaedcke | ....................... | 709/219 |
| 2008/0010425 A1 | 1/2008 | Funk et al. | | |
| 2008/0040425 A1 | 2/2008 | Hines | | |
| 2008/0040661 A1 | 2/2008 | Curtis et al. | | |
| 2009/0077670 A1* | 3/2009 | Schireson | ....................... | 726/27 |

OTHER PUBLICATIONS

Red Dot: "web content management": http://www.reddot.com/products_web_content_management_smartedit.htm as found on.http://www.archive.org , dated Jan. 1, 2006, Relevant pp. 1.

Interwoven: "Products".: http://www.interwoven.com/products/content_management/index.html as found on http://archive.org , dated Dec. 5, 2006, Relevant pp. 1.

Typo 3: "Feature List".: http://tvpo3.com/Feature_list.1243.0.html , as found on http://archive.org , dated Dec. 5, 2006, Relevant pp. 1-10.

Tridion: "Content Creation". http://www.tridion.com/Products/R5/ContentCreation.asp , Dec. 5, 2006, Relevant p. 1.

Zip Zap: "Update and Build your Web Site Online via your Web Browser": http://www.zipzap.biz/webeditonline.html, as found on http://www.archive.org , dated Feb. 6, 2005, Relevant pp. 1-2.

\* cited by examiner

DYNAMIC DISPLAY OF WEB PAGE CONTENT FOR EDITING AND REVIEW

BACKGROUND OF THE INVENTION

With web pages growing more sophisticated over the years, embedding objects such as hypertext links, images and videos into the web pages has become a common practice for web designers. Sometimes it is not desired to incorporate the content of these objects in to a web page as static content. Instead, it is preferred to have these objects still stored, run and maintained by a third party. A kind of dynamic link, or server side include, has been used to include and display within a web page an external object as it exists at an external location, e.g., a third party website, image, etc.

Since a server side include deals with an external object that is not designed by the web designer, and since web page design applications typically do not display server side include content dynamically during web page creation, review, and/or editing, it sometimes can be difficult for the designer have a clear sense while creating or editing a web page in which a server side included has been incorporated of what the published page would look like. Therefore, there is a need for a better way to create, review, and/or edit web pages into which one or more server side includes have been incorporated.

SUMMARY OF THE INVENTION

Facilitating definition of a web page is disclosed. In some embodiments, an editing interface enables a user to include in a web page the user currently is editing a potentially dynamic external data, such as a web page, an image, a video, or a system or environmental variable. One existing technique to include such dynamic data is the server side include. A web page designer defines the server side include, and at the time the web page is retrieved by a user (e.g., using browser software), the server responding to the request for the page obtains and inserts into the page a current content and/or other data or value for the server side include. Typically, web page design applications have displayed in the web page editing interface, in the place where a server side include has been inserted, a placeholder text and/or a piece of code to represent the server side include; not the current content or other data associated with and/or comprising the server side include.

Displaying server side include content (or other data) dynamically in web page editing interface is disclosed. In some embodiments, when a server side include or other external data is or has been incorporated into a web page that is currently being edited, the external data is retrieved from its external source and displayed in the editing interface as if the web page had already been published and is being viewed in a browser. In some embodiments, the external data is shown exactly the same in the editing interface as it would be shown in a browser. This approach enables a web designer to see while editing the web page what the final published web page would look like if/when published and viewed using a browser or other viewing software, without leaving the editing interface.

Sometimes in a corporate or other enterprise environment, after a web page is designed, there could be a long delay before it passes all the reviews and gets published. This feature of dynamically displaying an external data, e.g., a server side include, in the editing interface helps both the web designer and the reviewers to see during editing/review the web page as it would appear if published in its current form.

Providing a web page editing and/or review interface having live hypertext links is disclosed. In typical web page design applications, hypertext links have not been "live" as displayed in editing and/or review interfaces his is contrary to a hypertext link in the editing interface; i.e., selecting the link in such a web page design application interface did not result in the web page or other object associated with the link being retrieved and displayed dynamically. Instead, links either did not respond to being selected or attributes or other data associated with the link was displayed for viewing and/or editing, such as the URL or other locator or identifier of the web page or other object associated with the link. However, this approach is not always convenient.

For example, in the enterprise environment, a web page may be required to pass through a review and/or approval and/or other business process prior to being published. Reviewers may wish to check links, to ensure they function properly and that the web page being reviewed does not link to incorrect and/or inappropriate content. Using prior approaches, a reviewer would have to publish the web page and use separate (e.g., browser) software to view, the web page as published in order to be able to retrieve content to which the web page includes a hypertext link.

In some embodiments, a web page opened in the review interface is saved in an intermediate format instead of its final publishable html format. The intermediate format, such as XML, provides greater flexibility and enables it to be published into different formats depending on the various publishing scripts in a repository in which the web page and/or associated content is or is to be stored. In some embodiments, a reviewer could also choose a publishing method to interpret this intermediate format and display the web page in a specific way. In some embodiments, the review interface includes controls that enable a reviewer to approve a web page or even promote a web page to the next reviewer in line if there is a review/approval process stipulated in the repository. In some embodiments, when a link on the web page is clicked in the review interface, the interface leaves the current page and opens the new page that corresponds to the link. In some embodiments, the review interface will ask the user to save the current page, or ask the user if the user desires the page to be saved, before jumping to the new page. In some embodiments, the review interface will return to the current page that is under editing after the user closes the newly opened page. In some embodiments, the review interface behaves like a browser though the page under review is not published yet.

BRIEF DESCRIPTION OF THE DRAWINGS

The present invention will be readily understood by the following detailed description in conjunction with the accompanying drawings, and in which.

DETAILED DESCRIPTION

Figure 1:
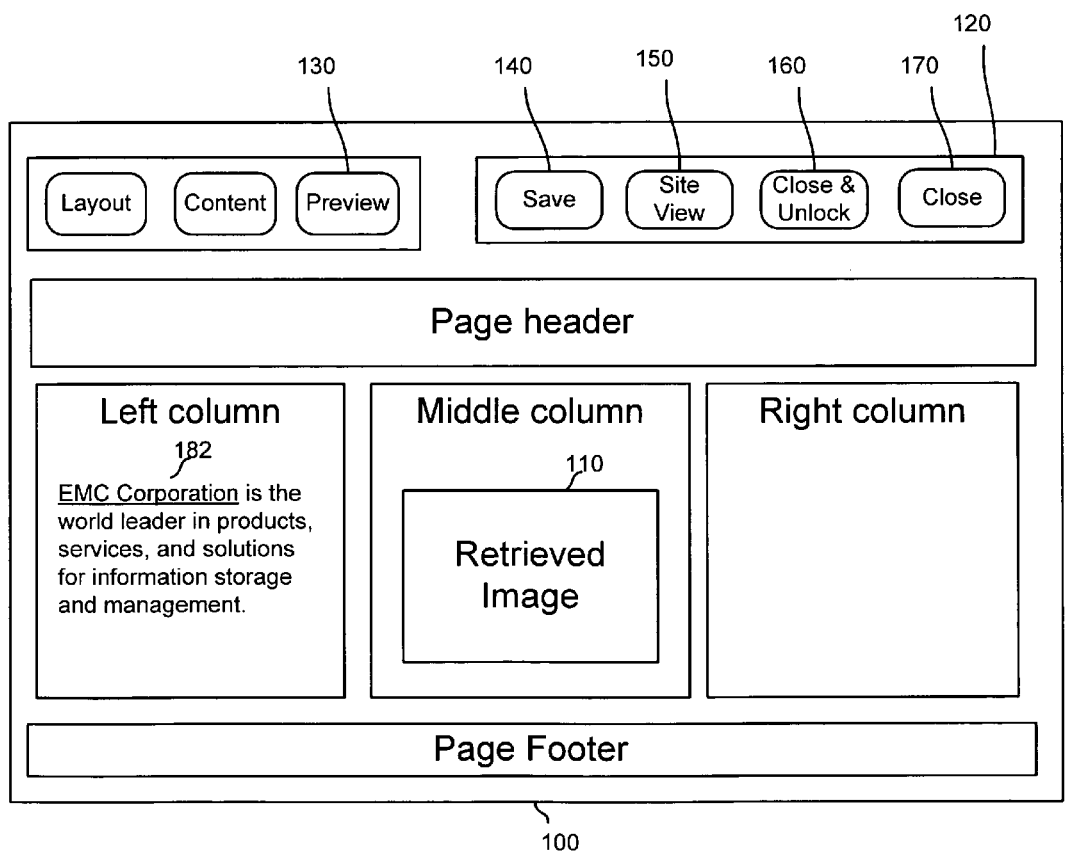
FIG. 1 shows an embodiment of an editing interface that displays an external data.

The invention can be implemented in numerous ways, including as a process, a system, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Facilitating definition of a web page is disclosed. In some embodiments, an editing interface enables a user to include in a web page the user currently is editing a potentially dynamic external data, such as a web page, an image, a video, or a system or environmental variable. One existing technique to include such dynamic data is the server side include. A web page designer defines the server side include, and at the time the web page is retrieved by a user (e.g., using browser software), the server responding to the request for the page obtains and inserts into the page a current content and/or other data or value for the server side include. Typically, web page design applications have displayed in the web page editing interface, in the place where a server side include has been inserted, a placeholder text and/or a piece of code to represent the server side include; not the current content or other data associated with and/or comprising the server side include.

Displaying server side include content (or other data) dynamically in web page editing interface is disclosed. In some embodiments, when a server side include or other external data is or has been incorporated into a web page that is currently being edited, the external data is retrieved from its external source and displayed in the editing interface as if the web page had already been published and is being viewed in a browser. In some embodiments, the external data is shown exactly the same in the editing interface as it would be shown in a browser. This approach enables a web designer to see while editing the web page what the final published web page would look like if/when published and viewed using a browser or other viewing software, without leaving the editing interface.

Sometimes in a corporate or other enterprise environment, after a web page is designed, there could be a long delay before it passes all the reviews and gets published. This feature of dynamically displaying an external data, e.g., a server side include, in the editing interface helps both the web designer and the reviewers to see during editing/review the web page as it would appear if published in its current form.

Providing a web page editing and/or review interface having live hypertext links is disclosed. In typical web page design applications, hypertext links have not been "live" as displayed in editing and/or review interfaces his is contrary to a hypertext link in the editing interface; i.e., selecting the link in such a web page design application interface did not result in the web page or other object associated with the link being retrieved and displayed dynamically. Instead, links either did not respond to being selected or attributes or other data associated with the link was displayed for viewing and/or editing, such as the URL or other locator or identifier of the web page or other object associated with the link. However, this approach is not always convenient. For example, in the enterprise environment, a web page may be required to pass through a review and/or approval and/or other business process prior to being published. Reviewers may wish to check links, to ensure they function properly and that the web page being reviewed does not link to incorrect and/or inappropriate content. Using prior approaches, a reviewer would have to publish the web page and use separate (e.g., browser) software to view the web page as published in order to be able to retrieve content to which the web page includes a hypertext link.

In some embodiments, a web page opened in the review interface is saved in an intermediate format instead of its final publishable html format. The intermediate format, such as XML, provides greater flexibility and enables it to be published into different formats depending on the various publishing scripts in a repository in which the web page and/or associated content is or is to be stored. In some embodiments, a reviewer could also choose a publishing method to interpret this intermediate format and display the web page in a specific way. In some embodiments, the review interface includes controls that enable a reviewer to approve a web page or even promote a web page to the next reviewer in line if there is a review/approval process stipulated in the repository. In some embodiments, when a link on the web page is clicked in the review interface, the interface leaves the current page and opens the new page that corresponds to the link. In some embodiments, the review interface will ask the user to save the current page, or ask the user if the user desires the page to be saved, before jumping to the new page. In some embodiments, the review interface will return to the current page that is under editing after the user closes the newly opened page. In some embodiments, the review interface behaves like a browser though the page under review is not published yet.

FIG. 1 shows an embodiment of an editing interface that displays an external data. An editing interface 100 displays a web page that is being edited. A dynamically included external image 110, e.g., a server side include, is displayed on the web page in interface 100. Instead of showing a line of code or reference, editing interface 100 or a process associated therewith retrieves the external data comprising image 110 from an associated external source and displays the image 110 in editing interface 100 in the location indicated by the web page designer. This approach in some embodiments enables a web page designer and/or reviewer to see without leaving the editing interface what the server side include and/or other external content would actually look like in the web page if/as published. In some embodiments if the source of the external image changes its content, the same changes will be reflected in interface 100. In some embodiments, the editing interface 100 and/or a process associated therewith checks periodically for changes to included external content, such as server side includes, and updates the included external content as displayed in the editing interface 100, if changes have occurred.

Interface 100 has several editing specific controls. A "Preview" control button 130 is currently selected to indicate that the web page is in the editing interface but server side includes such as image 110 should be displayed as it would be in the final published web page. In some embodiments, hypertext links such as link 182 (represented in the example shown by the underlined text "EMC Corporation", are not "live" when in the preview mode. Instead, selection of a hypertext link from within the editing interface 100 while in the preview mode results in attributes of the hypertext link being displayed, e.g., for editing.

A group of controls 120 are included in editing interface 100 in the example shown. A "Save" control button 140 is used to save changes made to the web page. In some embodiments, selection of save button 140 results in the content of the web page as stored in a storage location, such as a managed content repository in which metadata stored in a database is used to access, store, and otherwise managed content, being updated. In some embodiments, the web page remains open in editing interface 100, for further editing if desired, if save control 140 is selected. A "Close & Unlock" control button 160 is used to close the web page in interface 100 and release the lock the current web designer has on the page so other people can edit the web page, if desired. In some embodiments, selection of "close & unlock" control button 160 results in the web page currently being edited being closed and associated content being "check in" to a managed content repository, making the web page available to be checked out by another user. A "Close" control button 170 is used to close the web page in interface 100 without releasing the lock, e.g., by leaving associated content checked out to the current user and therefore unavailable to be checked out by others, as a user may desire if he/she must interrupt an editing session before he/she is done reviewing and/or making changes to the web page. A "Site View" control button 150 is used to leave the editing interface and open a review interface in which hypertext links such as link 182 are active; i.e., selection of a hypertext link results in the current page being left and the linked page (or other object) being retrieved and displayed. In some embodiments selection of site view control 150 results in a review interface such as the review interface 400 of FIG. 4, described more fully below, being displayed.

Figure 2:
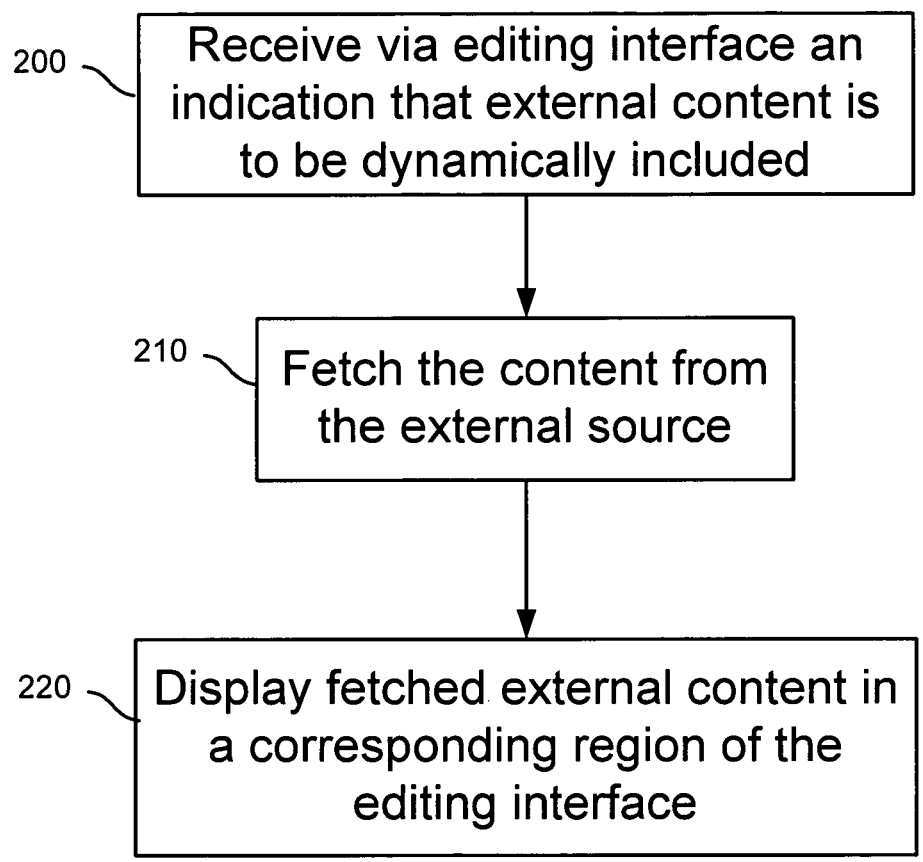
FIG. 2 is a flowchart illustrating a process used in one embodiment to display an external data in an editing interface.

FIG. 2 is a flowchart illustrating a process used in one embodiment to display an external data in an editing interface. Upon receiving an indication that an external content is to be dynamically included (200), the content is fetched from the external source (210) and displayed in the editing interface in the region specified by the user (220). In some embodiments, the external content is fetched periodically from the external source to keep the display up-to-date.

Figure 3:
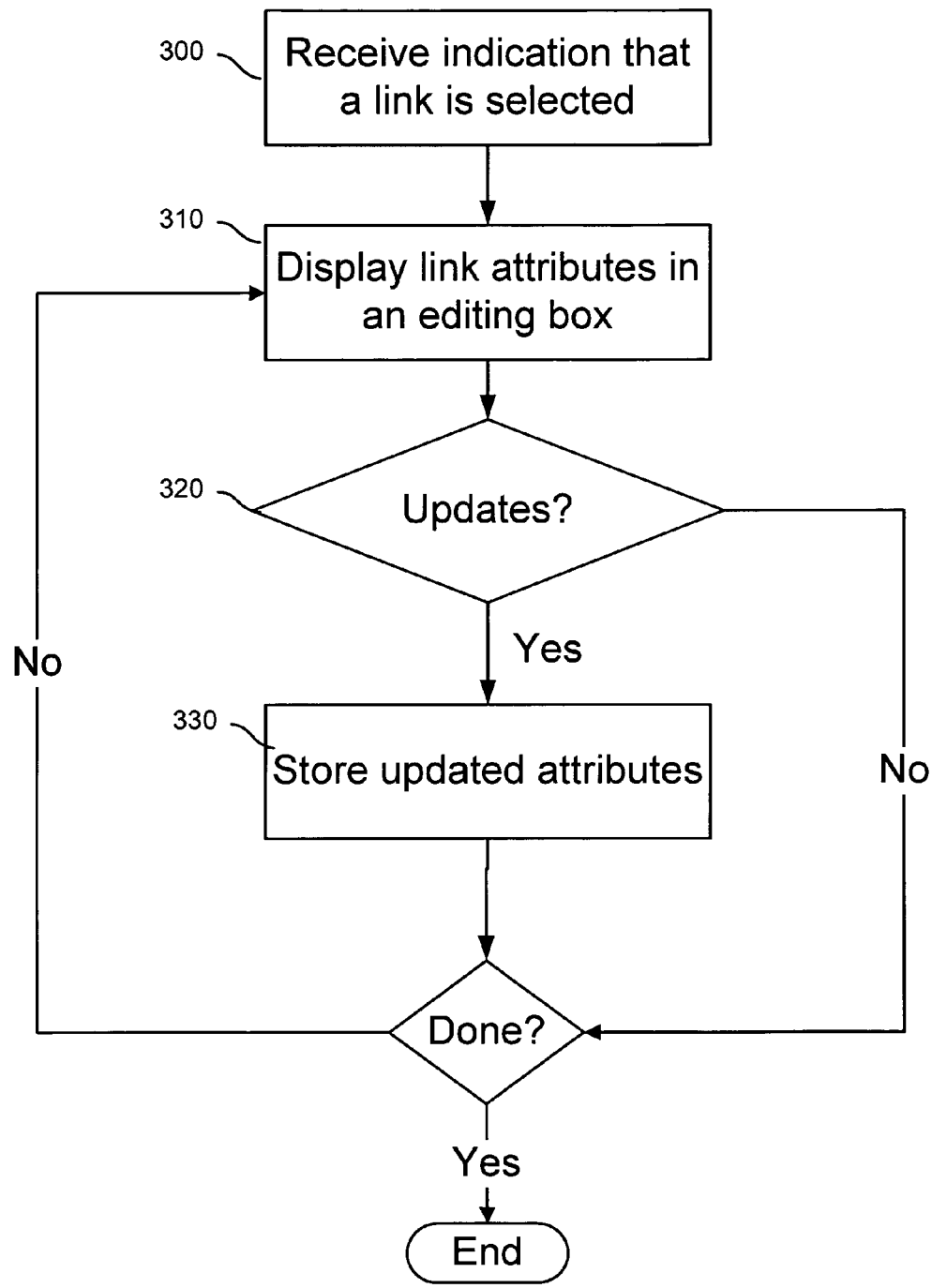
FIG. 3 is a flowchart illustrating a process used in one embodiment to respond to a user's click on a link in an editing interface.

FIG. 3 is a flowchart illustrating a process used in one embodiment to respond to a user's click on a link in an editing interface. Upon receiving an indication that a link has been selected (300), the attributes of the link are displayed in an editing box (310) on top of and/or adjacent to the current web page. If any updates to the link are entered into the editing box (320), the updated attributes are stored (330).

Figure 4:
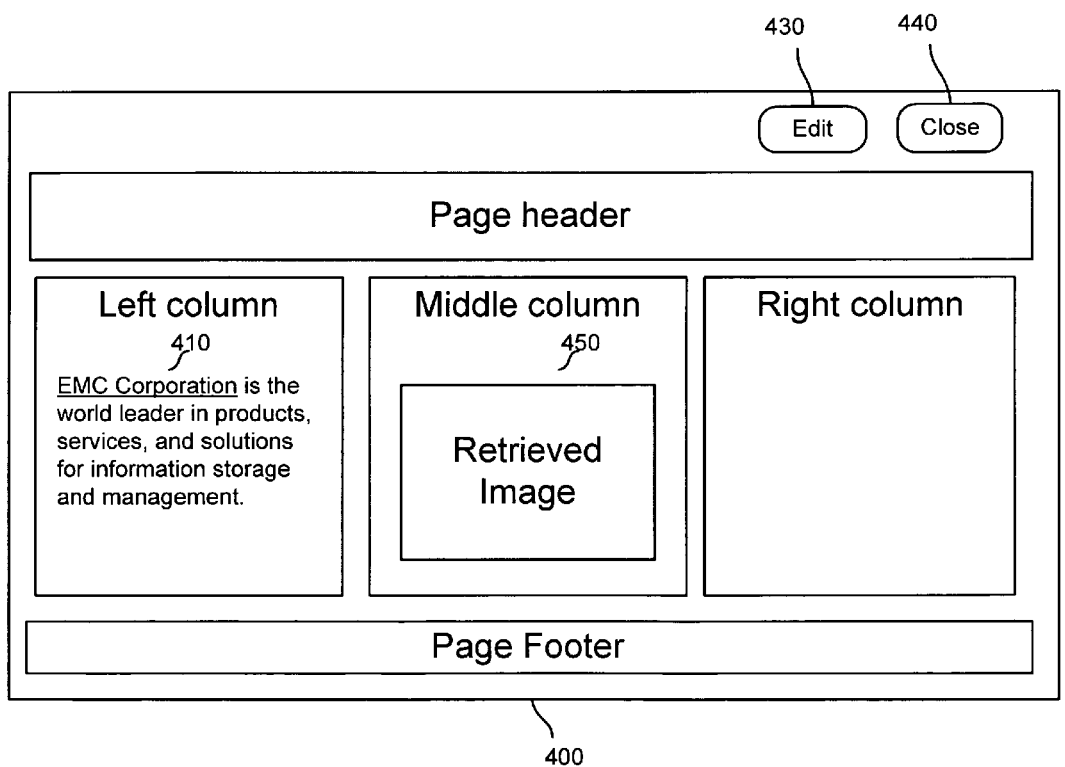
FIG. 4 shows an embodiment of a review interface.

FIG. 4 shows an embodiment of a review interface. A review interface 400 shows a web page as it would appear if displayed by a browser or other viewing software. Besides retrieving the data to display an external image 450 as in FIG. 1, hypertext links such as link 410 are active links; i.e., selection of a hypertext link from within review interface 400 results in the linked web page (or other object) being retrieved and displayed. In the example shown, selection of link 410 may result in a web page associated with "EMC Corporation", e.g., the company's homepage, being retrieved and displayed. An "Edit" control button 430 and a "Close" control button 440 are provided in the review interface 400 in the example shown. Clicking on the "Edit" control button 430 will leave the review interface and bring up an editing interface, such as the editing interface 100 shown in FIG. 1. Clicking on the "Close" control button 440 will close the current web page and leave the review interface. In some embodiments, there is a third control button called "Approve/Promote". When clicked, the interface will notify a business process and/or software or other logic managing a business process, such as a business process implemented by a content management system and/or application, that the current user has approved the web page under review, which depending on the business process may result in the web page being published or be promoted to the next reviewer in line.

Figure 5:
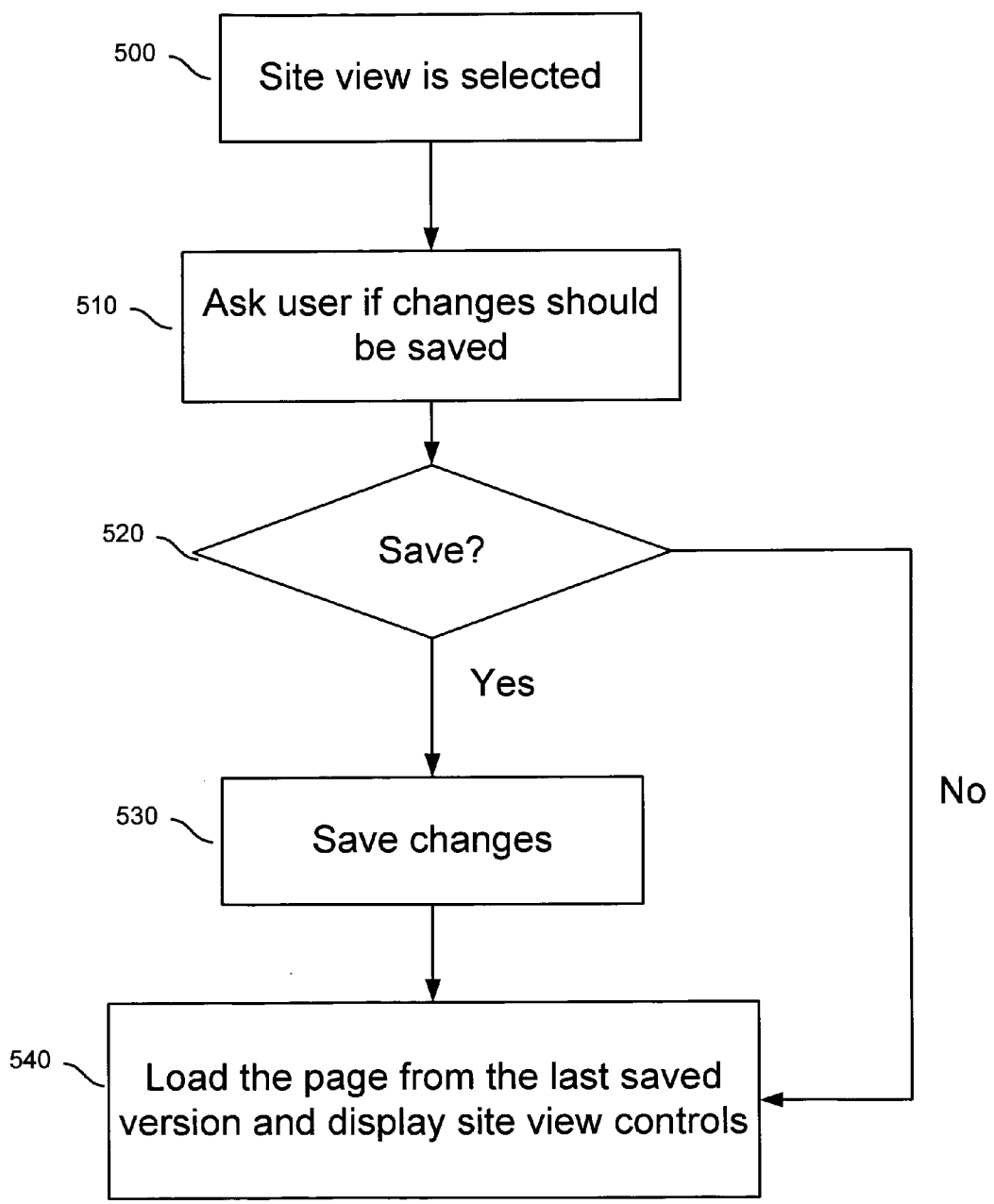
FIG. 5 is a flowchart illustrating a process used in one embodiment to switch from an editing interface to a review interface.

FIG. 5 is a flowchart illustrating a process used in one embodiment to switch from an editing interface to a review interface. When the "Site view" button (150) is selected (500), the user is prompted to indicate whether the changes to the page, if any, should be saved (510). In some embodiments, the page is saved in a repository associated with a content management system and/or application. In some embodiments, during editing a page is stored in memory in an intermediate format such as XML before being published to HTML or another form capable of being rendered by a browser. If the user decides to save the current page (520), the changes are saved (530) and the version of the web page that has just been saved (e.g., in the repository) is loaded into the review interface, or the "site view" (540). If changes are not saved, the last-saved version is retrieved and displayed in the reviewing interface and any changes since the last save are lost.

Figure 6A:
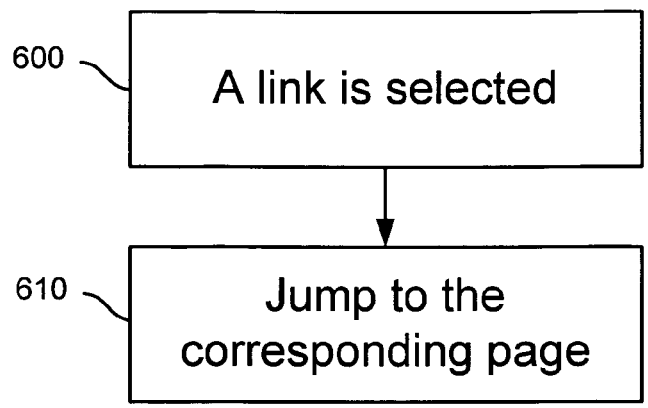
FIG. 6A is a flowchart illustrating a process used in one embodiment to respond to a user's click on a link in a review interface.

FIG. 6A is a flowchart illustrating a process used in one embodiment to respond to a user's click on a link in a review interface. When a link is selected in the review interface (600), the interface jumps to the new page that corresponds to the link (610).

Figure 6B:
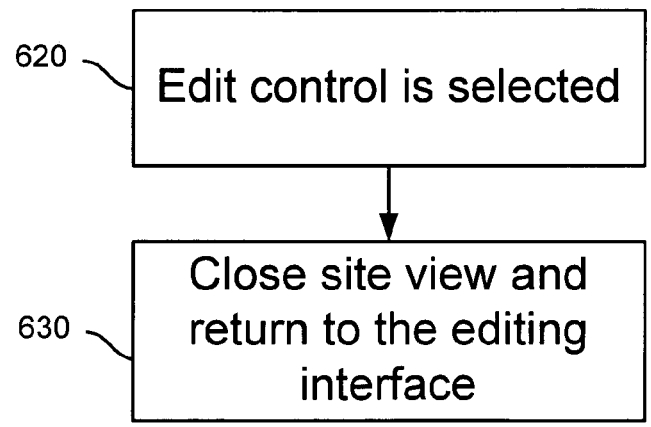
FIG. 6B is a flowchart illustrating a process used in one embodiment to respond when an edit control is selected in a review interface.

FIG. 6B is a flowchart illustrating a process used in one embodiment to respond when an edit control is selected in a review interface. When the "Edit" control button 440 is selected (620), the review interface, or the site view, is closed and the program returns to the editing interface, e.g., in a preview view (630).

Figure 6C:
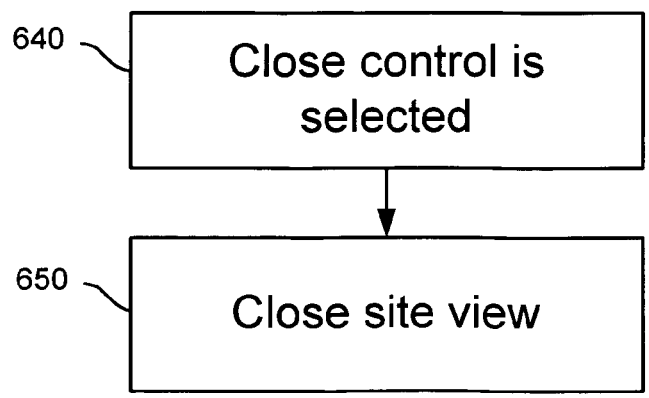
FIG. 6C is a flowchart illustrating a process used in one embodiment to respond when a close control is selected in a review interface.

FIG. 6C is a flowchart illustrating a process used in one embodiment to respond when a close control is selected in a review interface. When the "Close" control button 450 is selected (640), the review interface, or the site view, is closed (650).

Figure 7:
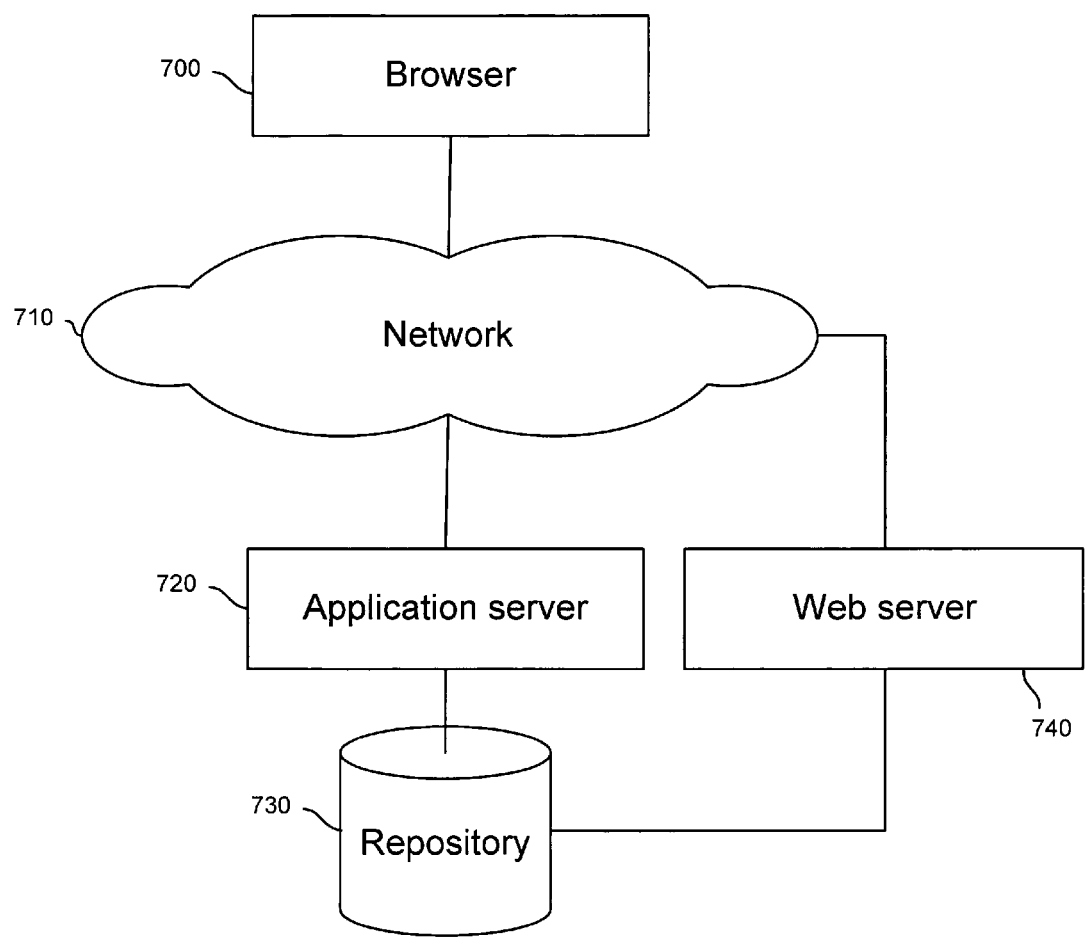
FIG. 7 shows an embodiment of web page building system and associated elements.

FIG. 7 shows an embodiment of web page building system and associated components. A browser 700 is used to access via a network 710 a web page building application running on an application server 720, e.g., to design a web page to be put on a web server 740. A business process management component comprising and/or associated with repository 730 keeps tracks of unpublished web pages that are in a review process. When the user saves the web page in the editing interface, the web page gets saved in repository 730. When the user chooses "Close & unlock" from the editing interface, repository 730 allows other users to edit the page or reviewers to review the page. In some embodiments, repository 730 will automatically notify the required reviewers, and promote the web page to the next reviewer in the approval/review process. Once the page has gone through the approval/review process, it is published and saved onto web server 740.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of facilitating definition of a web page, comprising:
   receiving via an editing interface an indication that a server side include associated with a media asset is to be incorporated into the web page from an external source, wherein:
   a) the media asset is one of: a video and an image;
   b) the external source is a third party source; and
   c) when the web page is requested by a user browser a server responding to the request obtains and inserts into the web page a current media asset currently associated with the server side include;
   retrieving an instant media asset currently associated with the server side include from the external source;
   displaying the instant media asset without leaving the editing interface as it would appear if the web page were published and then retrieved and displayed by a browser;
   using a processor to check periodically for changes in the associated media asset currently associated with the server side include; and
   in the event that one or more changes in the associated media asset have occurred, updating the displayed instant media asset without leaving the editing interface.

2. A method as recited in claim 1, further comprising:
   receiving an indication that a user desires to review the web page;
   displaying the web page to the user, in a review interface that includes one or more review controls, in a manner such that selection of a live hypertext link included in the web page results in the same action as would occur if the web page was published and the live hypertext link was selected for access from a browser.

3. A method as recited in claim 2, further comprising retrieving from a repository a data associated with the web page.

4. A method as recited in claim 3, wherein at least one of said one or more review controls enables the user to open the web page in the editing interface.

5. A method as recited in claim 4, wherein the editing interface is configured to display for editing attribute data associated with the live hypertext link, in the event the live hypertext link is selected from within the editing interface, without retrieving and displaying a second web page associated with the live hypertext link.

6. A method as recited in claim 5, wherein at least one of said one or more review controls enables the user to promote or approve the web page within a review or approval process.

7. A method as recited in claim 6, wherein the review or approval process is managed by a component comprising or otherwise associated with a repository in which data comprising or otherwise associated with the web page is stored.

8. A method as recited in claim 7, wherein after the web page has passed a review or approval process the web page is published by operation of a component or other process comprising or otherwise associated with a repository in which data comprising or otherwise associated with the web page is stored.

9. A method as recited in claim 8, further comprising providing the review interface with web browser functionality.

10. A method as recited in claim 9, wherein the web browser functionality comprising retrieving and displaying, in the event the live hypertext link is selected, a second web page associated with the live hypertext link.

11. A system for facilitating definition of a web page, comprising:
    a processor configured to:
       receive via an editing interface an indication a server side include associated with a media asset is to be incorporated into the web page from an external source, wherein:
       a) the media asset is one of: a video and an image;
       b) the external source is a third party source; and
       c) when the web page is requested by a user browser a server responding to the request obtains and inserts into the web page a current media asset currently associated with the server side include;
       retrieve an instant media asset currently associated with the server side include from the external source;
       display the instant media asset without leaving the editing interface as it would appear if the web page were published and then retrieved and displayed by a browser;
       check periodically for changes in the associated media asset currently associated with the server side include; and
       in the event that one or more changes in the associated media asset have occurred, updating the displayed instant media asset without leaving the editing interface;
    and
    a storage configured to store data associated with the web page, coupled to the processor.

12. A system as recited in claim 11, wherein the processor is further configured to:
    receive an indication that a user desires to review the web page;
    display the web page to the user, in a review interface that includes one or more review controls, in a manner such that selection of a live hypertext link included in the web page results in the same action as would occur if the web page was published and the live hypertext link was selected for access from a browser.

13. A system as recited in claim 12, wherein at least one of said one or more review controls enables the user to open the web page in the editing interface.

14. A system as recited in claim 13, wherein the web page is opened in the editing interface the processor is configured to display for editing attribute data associated with the link, in the event the link is selected from within the editing interface, without retrieving and displaying a second web page associated with the link.

15. A system as recited in claim 14, wherein at least one of said one or more review controls enables the user to promote or approve the web page within a review or approval process.

16. A computer program product for facilitating definition of a web page, the computer program product being embodied in a non-transitory computer readable storage medium and comprising computer instructions for:

receiving via an editing interface an indication that a server side include associated with a media asset is to be incorporated into the web page from an external source, wherein:
a) the media asset is one of: a video and an image;
b) the external source is a third party source; and
c) when the web page is requested by a user browser a server responding to the request obtains and inserts into the web page a current media asset currently associated with the server side include;

retrieving an instant media asset currently associated with the server side include from the external source;

displaying the instant media asset without leaving the editing interface as it would appear if the web page were published and then retrieved and displayed by a browser;

checking periodically for changes in the associated media asset currently associated with the server side include; and in the event that one or more changes in the associated media asset have occurred, updating the displayed instant media asset without leaving the editing interface.

17. A computer program product as recited in claim 16, further comprising computer instructions for:

receiving an indication that a user desires to review the web page;

displaying the web page to the user, in a review interface that includes one or more review controls, in a manner such that selection of a live hypertext link included in the web page results in the same action as would occur if the web page was published and the live hypertext link was selected for access from a browser.

18. A computer program product as recited in claim 17, wherein at least one of said one or more review controls enables the user to open the web page in the editing interface.

19. A computer program product as recited in claim 18, wherein the editing interface is configured to display for editing attribute data associated with the live hypertext link, in the event the live hypertext link is selected from within the editing interface, without retrieving and displaying a second web page associated with the live hypertext link.

* * * * *